United States Patent
Maehara et al.

(10) Patent No.: US 6,556,641 B2
(45) Date of Patent: Apr. 29, 2003

(54) APPARATUS AND METHOD FOR HANDLING REACTOR-INTERNAL EQUIPMENTS

(75) Inventors: Takeshi Maehara, Yokohama (JP); Koichi Soma, Yokohama (JP); Kazuo Sakamaki, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/923,342

(22) Filed: Aug. 8, 2001

(65) Prior Publication Data

US 2002/0003850 A1 Jan. 10, 2002

Related U.S. Application Data

(62) Division of application No. 09/300,400, filed on Apr. 27, 1999.

(30) Foreign Application Priority Data

Apr. 27, 1998 (JP) .......................... 10-117270

(51) Int. Cl.$^7$ .............................................. G21C 19/00
(52) U.S. Cl. ........................................ 376/260; 376/262
(58) Field of Search ............................... 376/260, 262

(56) References Cited

U.S. PATENT DOCUMENTS

| | | | |
|---|---|---|---|
| 3,938,845 A | * 2/1976 | Fehl | 294/86 |
| 4,713,210 A | * 12/1987 | Germer | 376/233 |
| 4,904,443 A | * 2/1990 | Carruth | 376/233 |
| 5,331,675 A | 7/1994 | Hosoya et al. | 376/260 |
| 5,377,239 A | 12/1994 | Nopwaskey et al. | 376/260 |
| 5,473,645 A | 12/1995 | Kowdley | 376/272 |
| 5,521,950 A | 5/1996 | Whitling | 376/260 |
| 5,570,399 A | 10/1996 | Sakamaki | 376/260 |
| 5,600,685 A | 2/1997 | Izzo et al. | 376/260 |
| 6,047,037 A | 4/2000 | Wivagg | 376/260 |

FOREIGN PATENT DOCUMENTS

JP        10-73692      3/1998   ............... 376/260

* cited by examiner

*Primary Examiner*—Michael J. Carone
*Assistant Examiner*—R Palabrica
(74) *Attorney, Agent, or Firm*—Foley & Lardner (57) ABSTRACT

There are provided a control rod holding unit 16 for releasably holding a control rod 7 which is loaded in a reactor vessel 1, and fuel support/control rod guide tube holding unit 17 for releasably holding a fuel support 8 which supports a bottom end of a fuel assembly 10 and a control rod guide tube 6 on which the fuel support 8 is placed at top end. The control rod holding unit 16 and the fuel support/control rod guide tube holding unit 17 are fitted to a main body frame 26 which can be hoisted down inside the reactor vessel 1. Accordingly, there can be provided a reactor-internal equipment handling apparatus and method which are capable of reducing a term of work which is required for operations to load/unload the control rods, the fuel supports, and the control rod guide tubes.

2 Claims, 12 Drawing Sheets

PRIOR ART

F I G. 10

PRIOR ART

F I G. 11

PRIOR ART

F I G. 12

PRIOR ART

F I G. 13

APPARATUS AND METHOD FOR HANDLING REACTOR-INTERNAL EQUIPMENTS

This is a Divisional Application of application Ser. No. 09/300,400, filed Apr. 27, 1999.

BACKGROUND OF THE INVENTION

1. Field of the Invention

The present invention relates to an apparatus and a method for handling reactor-internal equipments and, more particularly, an apparatus and a method for loading/unloading control rods, fuel supports, and control rod guide tubes into/from a boiling water reactor (referred to as "BWR" hereinafter).

2. Description of the Related Art

Figure 10:
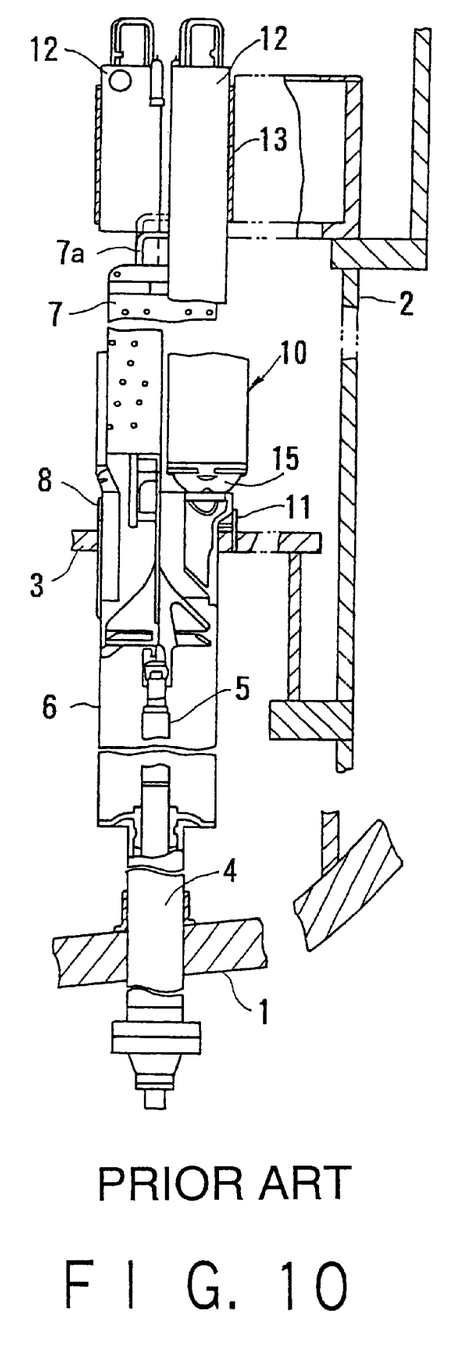
FIG. 10 is a fragmental sectional view showing a part of a reactor-internal structure of the BWR in an enlarged manner.

FIG. 10 is a fragmental sectional view showing a part of a reactor-internal structure of the BWR in an enlarged manner. As shown in FIG. 10, in the BWR, a core plate 3 is provided to a shroud 2 which is constructed integrally with a reactor pressure vessel (reactor vessel) 1. Control rod drive mechanism housings (referred to as "CRD housings" hereinafter) 4 are provided to a bottom portion of the reactor pressure vessel 1 which is located at a lower portion of the core plate 3. A control rod drive mechanism (referred to as "CRD" hereinafter) 5 is installed inside the CRD housing 4.

A control rod guide tube (referred to as "CRGT" hereinafter) 6 is provided on the CRD housing 4. The CRGTs 6 are supported to be slightly protruded upwardly from the core plate 3. A fuel support(referred to as "FS" hereinafter) 8 is detachably attached to an upper opening portion of the CRGT 6. The CRGT 6 and the FS 8 are fixed by a positioning pin 11 which is provided on the core plate 3.

A control rod (referred to as "CR" hereinafter) 7 with a cruciform lateral sectional shape is provided in the CRGT 6 to be moved vertically. A bottom end of the CR 7 is coupled to a top end of the CRD 5. The CRs 7 can be inserted into clearances between the fuel assemblies 10 from top ends of the CRGTs 6 respectively.

A top portion of the FS 8 supports a bottom portion 15 of the fuel assembly 10. Also, a top portion 12 of the fuel assembly 10 is supported by an top guide 13 which is provided to the shroud 2.

Figure 11:
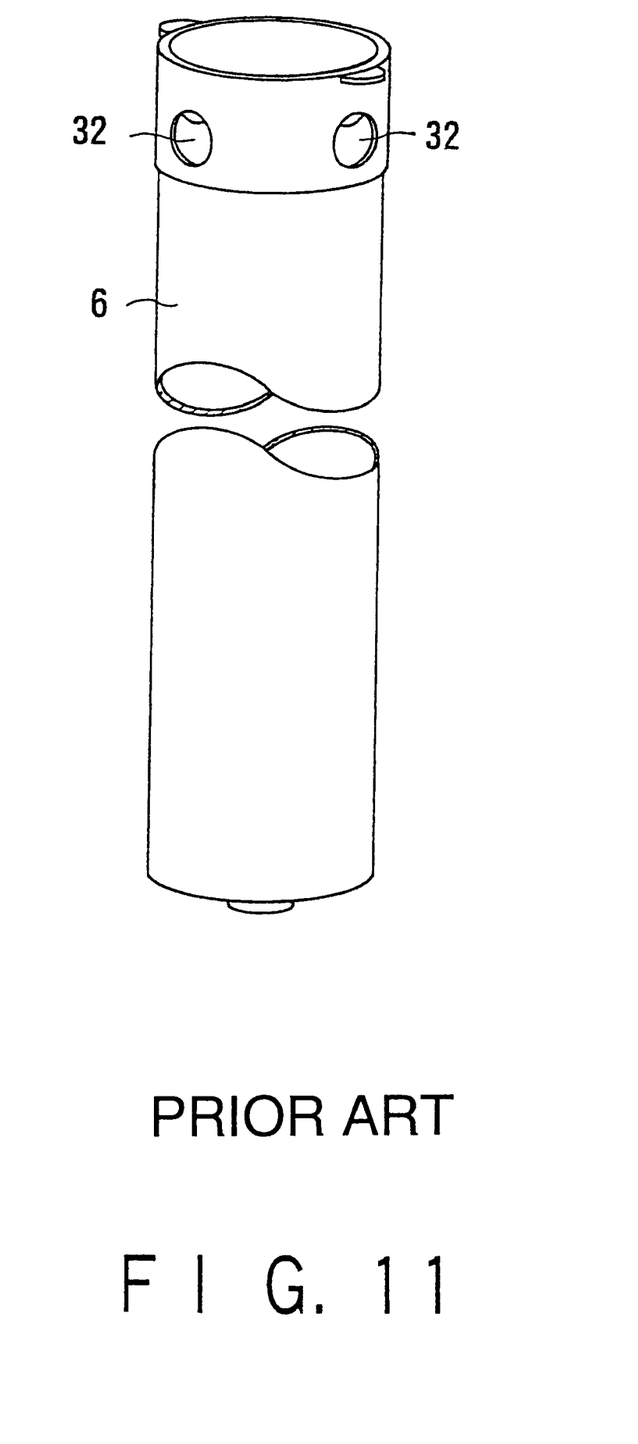
FIG. 11 is a perspective view, partially omitted, showing a control rod guide tube of the BWR.

FIG. 11 is a perspective view, partially omitted, showing an example of the CRGT 6 of the BWR. As shown in FIG. 11, a plurality of CRGT orifices 32 are formed on a top end side wall of the CRGT 6.

Figure 12:
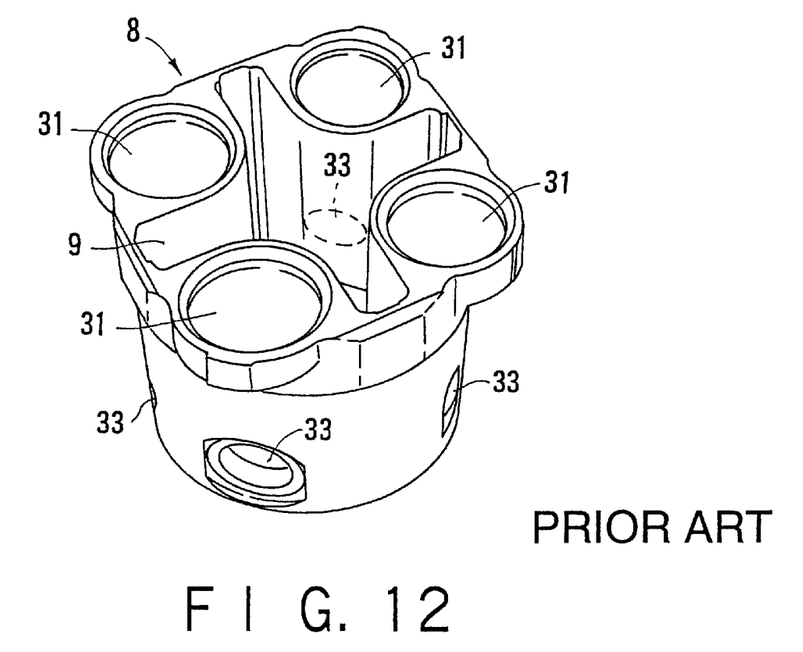
FIG. 12 is a perspective view showing a fuel support of the BWR.

FIG. 12 is a perspective view showing an example of the FS 8 of the BWR. As shown in FIG. 12, a cruciform through hole 9 into which the CR 7 is inserted is formed in the FS 8. Four fuel assembly sustaining holes 31, which sustain four fuel assemblies 10 respectively, are formed on a top portion of the FS 8. In addition, a plurality of fuel support orifices (referred to as "FS orifices" hereinafter) 33 are formed on a bottom side surface of the FS 8.

Figure 13:
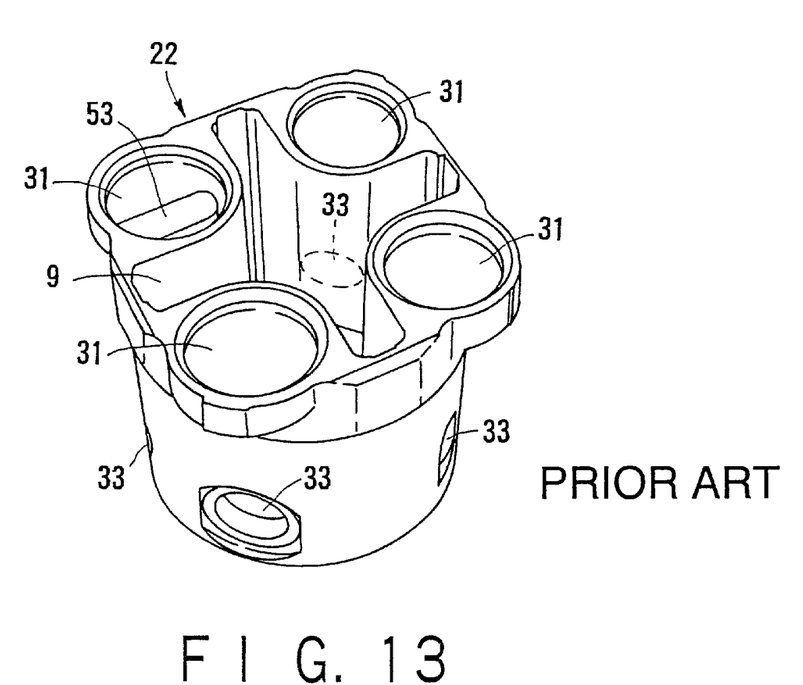
FIG. 13 is a perspective view showing a fuel support with pin of the BWR.

FIG. 13 is a perspective view showing the fuel support with pin (referred to as "Pin-FS" hereinafter) 22 of the BWR. The Pin-FSs 22 are provided to support mimic fuel assemblies (not shown) arranged in a peripheral portion of the core. This Pin-FS 22 is constructed by adding a pin 53 to the FS 8 shown in FIG. 12.

Then, if the CRs 7 are exchanged in the periodical inspection, the CRs 7 must be exchanged after the fuel assemblies 10 and the FSs 8, which are positioned at an upper location than the CRS 7, have been removed. The fuel assemblies 10 are unloaded by a refueling machine (not shown) which is installed on an operation floor (not shown), and then the CRS 7 and the FSs 8 are unloaded to outside the reactor.

As an equipment employed to execute unloading operations of the CRs 7 and the FSs 8, a CR & FS grapple (not shown) which can grasp the handle 7a of the CR 7 and the FS 8 at the same time has been proposed. After the CRs 7 and the FSs 8 have been unloaded from the reactor by the CR & FS grapple, the exchanging operation of the CRs 7 can be performed.

In addition, there is a rare case where the CRGTs 6 must be removed. In this case, such CRGTs 6 can be removed by a CRGT grapple (not shown).

However, in the event that the unloading operations of all the CRs 7, the FSs 8, and the CRGTs 6 from the reactor and the installing operations of them into the reactor must be performed in the periodical inspection or in the preventive maintenance, etc., there have been such problems that, if the CR & FS grapple and the CRGT grapple, for example, are employed, a time required for such operations is extremely prolonged and thus an exposure dose of the operator is increased correspondingly. Further, there has been such a problem that, if the CRs 7, the FSs 8, and the CRGTs 6 are unloaded from the reactor separately, it is difficult to secure respective storage spaces for them.

SUMMARY OF THE INVENTION

Therefore, it is an object of the present invention to provide a reactor-internal equipment handling apparatus and method capable of reducing a term of work which is needed for operations to load/unload control rods, fuel supports, and control rod guide tubes.

In order to achieve the object, according to the present invention, there is provided a reactor-internal equipment handling apparatus comprising: control rod holding means for releasably holding a control rod which is loaded in a reactor vessel; fuel support/control rod guide tube holding means for releasably holding both a fuel support, which supports a bottom end of a fuel assembly, and a control rod guide tube, on which the fuel support is placed at top end; and a main body frame to which both the control rod holding means and the fuel support/control rod guide tube holding means are fitted and is adapted to be hung down inside the reactor vessel.

Preferably, in the reactor-internal equipment handling apparatus, the fuel support/control rod guide tube holding means includes an orifice engaging member which is adapted to engage edge portions of orifices formed in the fuel support and the control rod guide tube, an orifice engaging member linking mechanism for manipulating the orifice engaging member, and orifice engaging member driving means for driving the orifice engaging member linking mechanism.

Preferably, the reactor-internal equipment handling apparatus further comprises a stroke varying mechanism for varying an operating stroke of the orifice engaging member linking mechanism; wherein an amount of motion of the orifice engaging member is adjusted by changing the operating stroke of the orifice engaging member linking mechanism by the stroke varying mechanism such that the orifice engaging member engages only the edge portion of the orifice formed in the fuel support.

Preferably, in the reactor-internal equipment handling apparatus, the orifice engaging member has stepped portions which come into contact with the edge portions of the orifices formed in the fuel support and the control rod guide tube, and wherein the orifice engaging member linking mechanism is constructed to disable a motion of the orifice engaging member in a situation that the stepped portion of the orifice engaging member comes into contact with the edge portion of the orifice.

Preferably, in the reactor-internal equipment handling apparatus, the control rod holding means has a handle engaging member which is swingable and holds a hoisting handle provided on a top end of the control rod, and handle engaging member driving means for driving the handle engaging member to swing, and wherein the handle engaging member is formed of a hook member, and an own weight of the control rod is applied to hold a engaged state of the hoisting handle by the handle engaging member in a situation that the control rod holding means hoists the control rod via the handle engaging member.

Preferably, in the reactor-internal equipment handling apparatus, the control rod holding means and the fuel support/control rod guide tube holding means are fitted to the main body frame such that these means can be relatively displaced mutually along a longitudinal direction of the control rod, and both the fuel support and the control rod guide tube are hoisted after the control rod is slightly hoisted.

Preferably, the reactor-internal equipment handling apparatus further comprises a holding state detecting mechanism for detecting both a holding state of the control rod holding means about the control rod and a holding state of the fuel support/control rod guide tube holding means about the fuel support and the control rod guide tube; and a positioning state detecting mechanism for detecting a positioning state of the main body frame in the reactor vessel.

Preferably, in the reactor-internal equipment handling apparatus, the holding state detecting mechanism has a holding state confirming indicator lamp whose lighting state is changed depending upon a change in the holding states of the control rod holding means and the fuel support/control rod guide tube holding means, and the positioning state detecting mechanism has a positioning state confirming indicator lamp whose lighting state is changed depending upon a change in the positioning state of the main body frame in the reactor vessel.

Preferably, in the reactor-internal equipment handling apparatus, the positioning state detecting mechanism further includes a motion limiting mechanism for limiting a motion of the fuel support/control rod guide tube holding means when the main body frame is not properly placed at a predetermined position in the reactor vessel.

Preferably, the reactor-internal equipment handling apparatus further comprises a motion limiting mechanism locking device for making the motion limiting mechanism inoperative temporarily.

In order to achieve the object, according to the present invention there is provided a reactor-internal equipment handling method of loading/unloading equipment into/from a reactor vessel with a reactor-internal equipment handling apparatus comprising: control rod holding means for releasably holding a control rod which is loaded in a reactor vessel, fuel support/control rod guide tube holding means for releasably holding both a fuel support, which supports a bottom end of a fuel assembly, and a control rod guide tube, on which the fuel support is placed at a top end, a main body frame to which both the control rod holding means and the fuel support/control rod guide tube holding means are fitted and adapted to be hung down inside the reactor vessel, a holding state detecting mechanism for detecting both a holding state of the control rod holding means about the control rod, and a holding state of the fuel support/control rod guide tube holding means about the fuel support and the control rod guide tube, and a position state detecting mechanism for detecting a positioning state of the main body frame in the reactor vessel, the method comprising: detecting a positioning state of the main body frame in the reactor vessel with the positioning state detecting mechanism in order to confirm that the main body frame is properly positioned; holding the control rod by the control rod holding means and also holding both the fuel support and the control rod guide tube with the fuel support/control rod guide tube holding means; detecting, with the holding state detecting mechanism, both a holding state of the control rod holding means about the control rod and a holding state of the fuel support/control rod guide tube holding means about the fuel support and the control rod guide tube, to confirm that the control rod holding means holds the control rod and the fuel support/control rod guide tube holding means holds the fuel support and the control rod guide tube; and hoisting the main body frame by a fuel exchanger and simultaneously loading or unloading all of the control rod, the fuel support, and the control rod guide tube into or from the reactor vessel.

Preferably, in the reactor-internal equipment handling method the fuel support/control rod guide tube holding means includes an orifice engaging member which is adapted to engage edge portions of orifices formed in the fuel support and the control rod guide tube, an orifice engaging member linking mechanism for manipulating the orifice engaging member, and orifice engaging member driving means for driving the orifice engaging member linking mechanism, and wherein the orifice engaging member is simultaneously brought into contact with the edge portions of the orifices formed in the fuel support and the control rod guide tube.

DETAILED DESCRIPTION OF THE PREFERRED EMBODIMENTS

A reactor-internal equipment handling apparatus according to an embodiment of the present invention will be explained in detail with reference to the accompanying drawings hereinafter.

Figure 1:
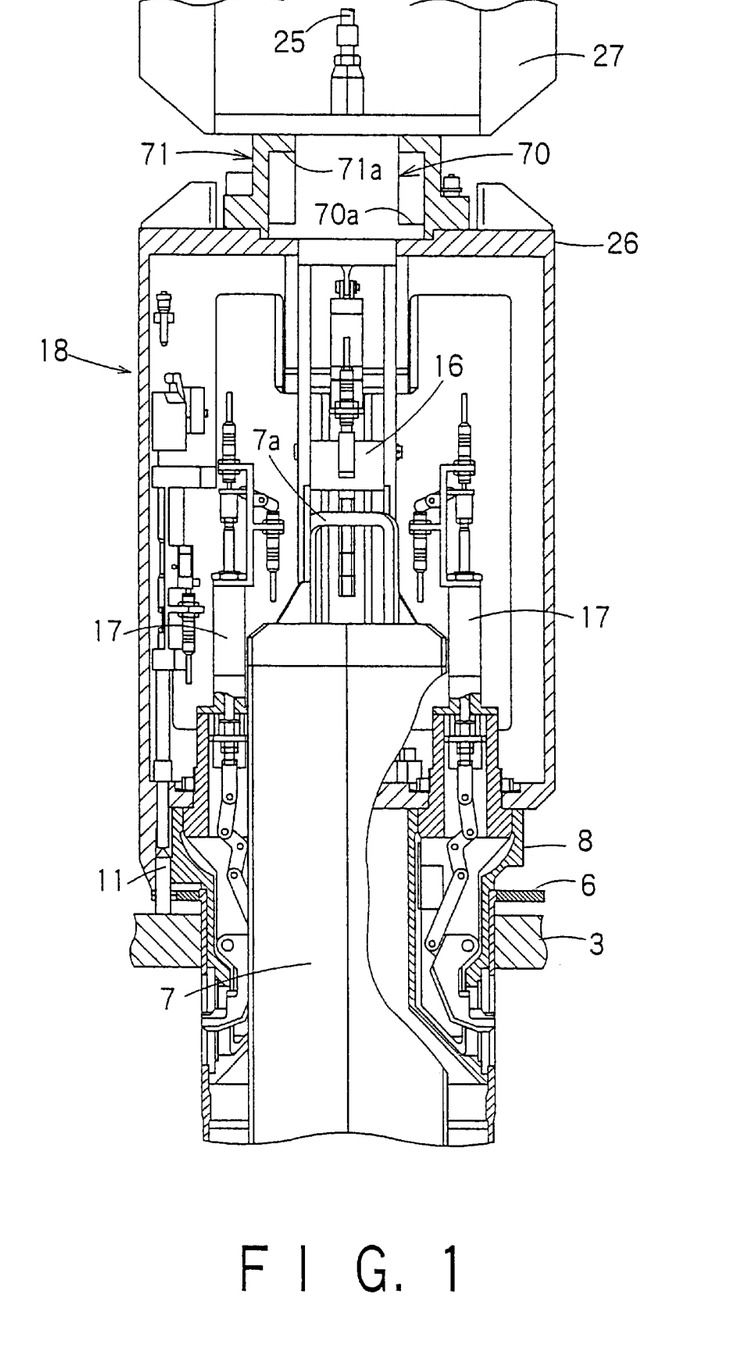
FIG. 1 is a longitudinal sectional view showing major parts of a reactor-internal equipment handling apparatus according to an embodiment of the present invention.

FIG. 1 is a longitudinal sectional view showing a reactor-internal equipment handling apparatus 18 according to an embodiment of the present invention. This reactor-internal equipment handling apparatus 18 can simultaneously load/unload all of the CR 7, the FS 8, and the CRGT 6 into/from a reactor by a remote manipulation.

Figure 2:
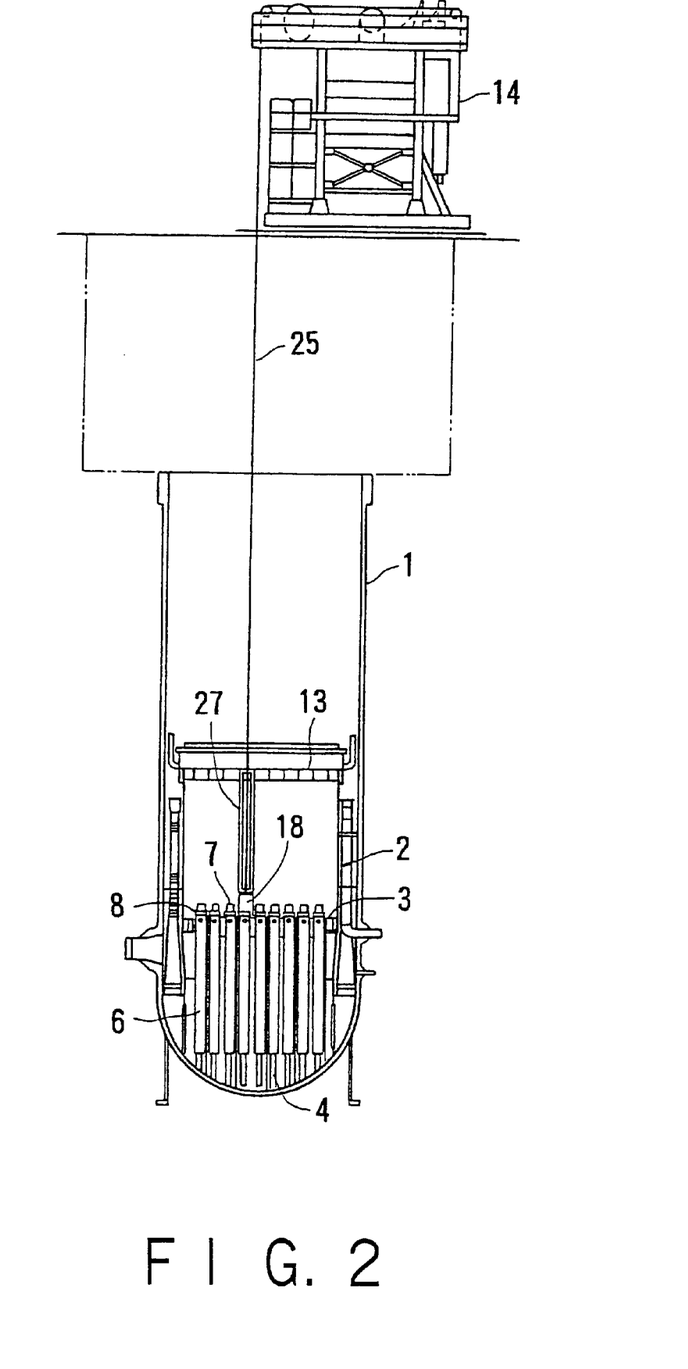
FIG. 2 is a longitudinal sectional view showing a state where the reactor-internal equipment handling apparatus according to the embodiment of the present invention is installed in a reactor pressure vessel.

The reactor-internal equipment handling apparatus 18 has a main body frame 26. FIG. 1 shows a state where the main body frame 26 is properly positioned at a predetermined position in a reactor pressure vessel 1 (see FIG. 2). FIG. 2 is a longitudinal sectional view showing a state where the reactor-internal equipment handling apparatus 18 is installed inside the reactor pressure vessel 1 by a refueling machine 14. In this case, when the reactor-internal equipment handling apparatus 18 is to be utilized, four fuel assemblies 10 (see FIG. 10) which are located in an objective working area are pulled out from the core previously by the refueling machine 14.

A top end of the main body frame 26 is fitted to a bottom end of a hoist rope 25 of the refueling machine 14 shown in FIG. 2 such that the main body frame 26 can be lifted up and down by there fueling machine 14. A guide member 27 is fitted to the hoist rope 25 to be faced to a top surface of the main body frame 26.

To the main body frame 26 are fitted a control rod grapple (referred to as "CR grapple" hereinafter) 16 acting as a control rod holding means which releasably holds the CR 7 being placed inside the reactor pressure vessel 1, and fuel support/control rod guide tube grapples (referred to as "FS/CRGT grapples" hereinafter) 17 each acting as a fuel support/control rod guide tube holding means which releasably holds both the FS 8, which supports the bottom end of the fuel assembly 10, and the CRGT 6, on which the FS 8 is positioned at top end.

Figure 3:
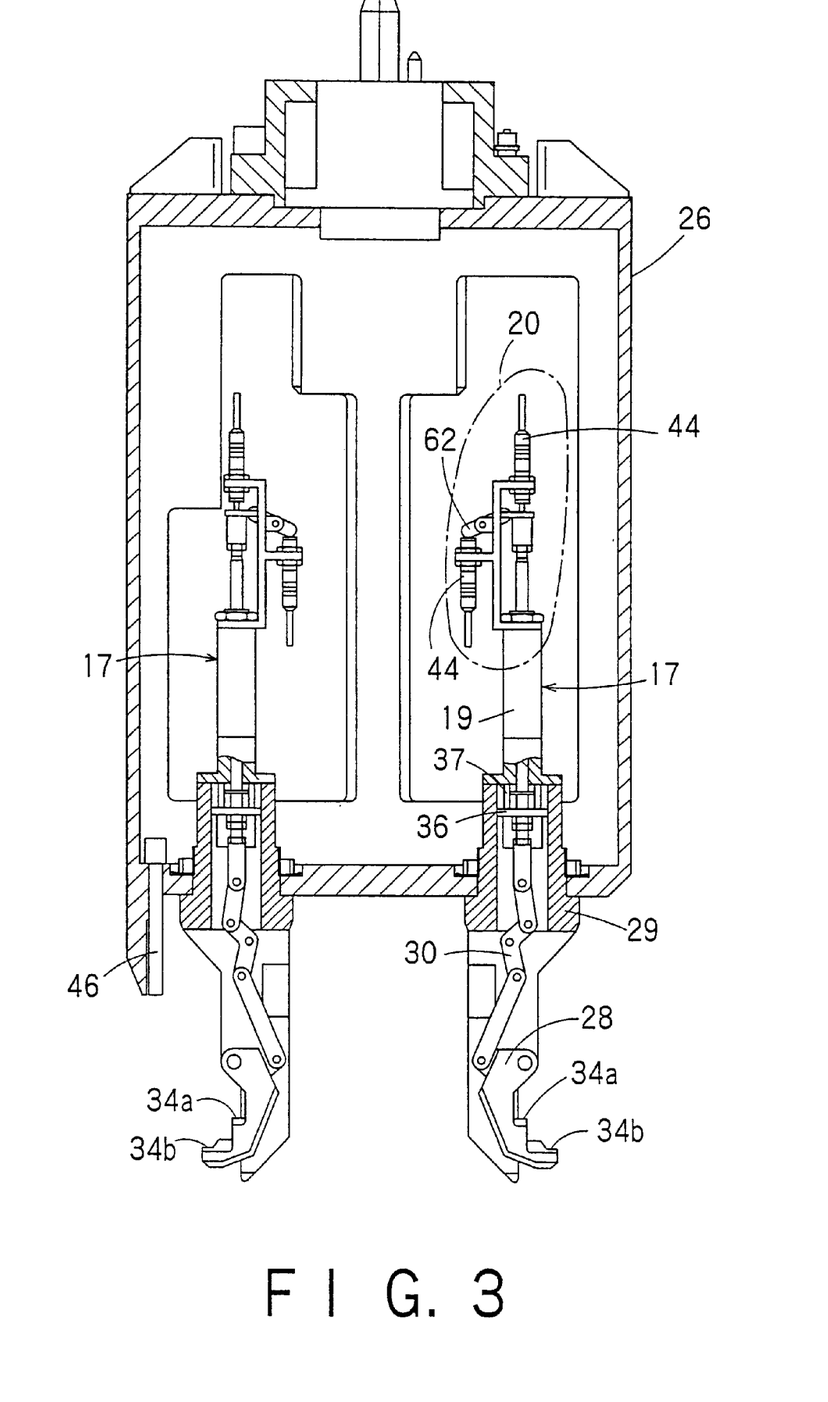
FIG. 3 is a longitudinal sectional view showing a main body frame and FS/CRGT grapples of the reactor-internal equipment handling apparatus according to the embodiment of the present invention in an enlarged manner.

FIG. 3 is a longitudinal sectional view showing the main body frame 26 and the FS/CRGT grapples 17 in an enlarged manner. A pair of FS/CRGT grapples 17 are fitted to the main body frame 26. Each of the FS/CRGT grapples 17 comprises an orifice engaging hook (orifice engaging member) 28 which can engage edge portions of both the FS orifices 33 shown in FIG. 12 and the CRGT orifices 32 shown in FIG. 11, an orifice engaging hook linking mechanism (orifice engaging member linking mechanism) 30 which is employed to operate the orifice engaging hook 28, and an orifice engaging hook driving cylinder (orifice engaging member driving means) 19 which is employed to drive the orifice engaging hook linking mechanism 30. Preferably, each of the orifice engaging hook driving cylinders 19 is composed of an air cylinder.

Also, a clamping state detecting mechanism (holding state detecting mechanism) 20, which detects holding states of the FS/CRGT grapples 17 about the FS 8 and the CRGT 6, is provided to each of the FS/CRGT grapples 17. This clamping state detecting mechanism 20 is placed on a top portion of the orifice engaging hook driving cylinder 19. The clamping state detecting mechanism 20 has limit switches (detection switches) 44 whose on/off state can be switched depending on a change in clamping states.

More particularly, the clamping state detecting mechanism 20 has a limit switch 44 which is directly on/off-operated by an output axis of the orifice engaging hook driving cylinder 19 when the output axis is moved back and forth simultaneously with a motion of the orifice engaging hook 28, and a limit switch 44 which is on/off-operated by transmitting a back-and-forth motion of an output axis via a lever mechanism 62.

Further, each of the FS/CRGT grapples 17 has a guide portion 29. This guide portion 29 has a function of seating the main body frame 26 on a predetermined position without fail by guiding an inside of the fuel assembly sustaining hole 31 (see FIG. 12) of the FS 8.

Both an FS stepped portion 34a which comes into contact with an edge portion of the FS orifice 33 (see FIG. 12) of the FS 8, and a CRGT stepped portion 34b which comes into contact with an edge portion of the CRGT orifice 32 (see FIG. 11) of the CRGT 6 are formed on the orifice engaging hook 28. With the use of the FS stepped portions 34a and the CRGT stepped portions 34b, both the FS 8 and the CRGT 6 can be handled simultaneously.

The orifice engaging hook linking mechanism 30 is so constructed that an opening/closing motion of the orifice engaging hook 28 can be disabled in the situation that the FS stepped portion 34a and the CRGT stepped portion 34b are brought into contact with the edge portions of the FS orifice 33 and the CRGT orifice 32 respectively.

In more detail, when the orifice engaging hook linking mechanism 30 is shifted from its clamping state (holding state) to its releasing state (non-holding state), the orifice engaging hook 28 once protrudes outwardly from the orifices 32, 33 and then withdraws inwardly. Thus, in the situation that both the FS 8 and the CRGT 6 are being hoisted or only the FS 8 is being hoisted, a mechanical lock can be made by its own weight of the hoisted substance and the FS stepped portions 34a and the CRGT stepped portions 34b of the orifice engaging hooks 28.

Therefore, even when either an actuating pressure of the orifice engaging hook driving cylinder 19 is lost at the worst or the operator operates it erroneously, the hoisted substance is never released or unengaged.

Figure 4:
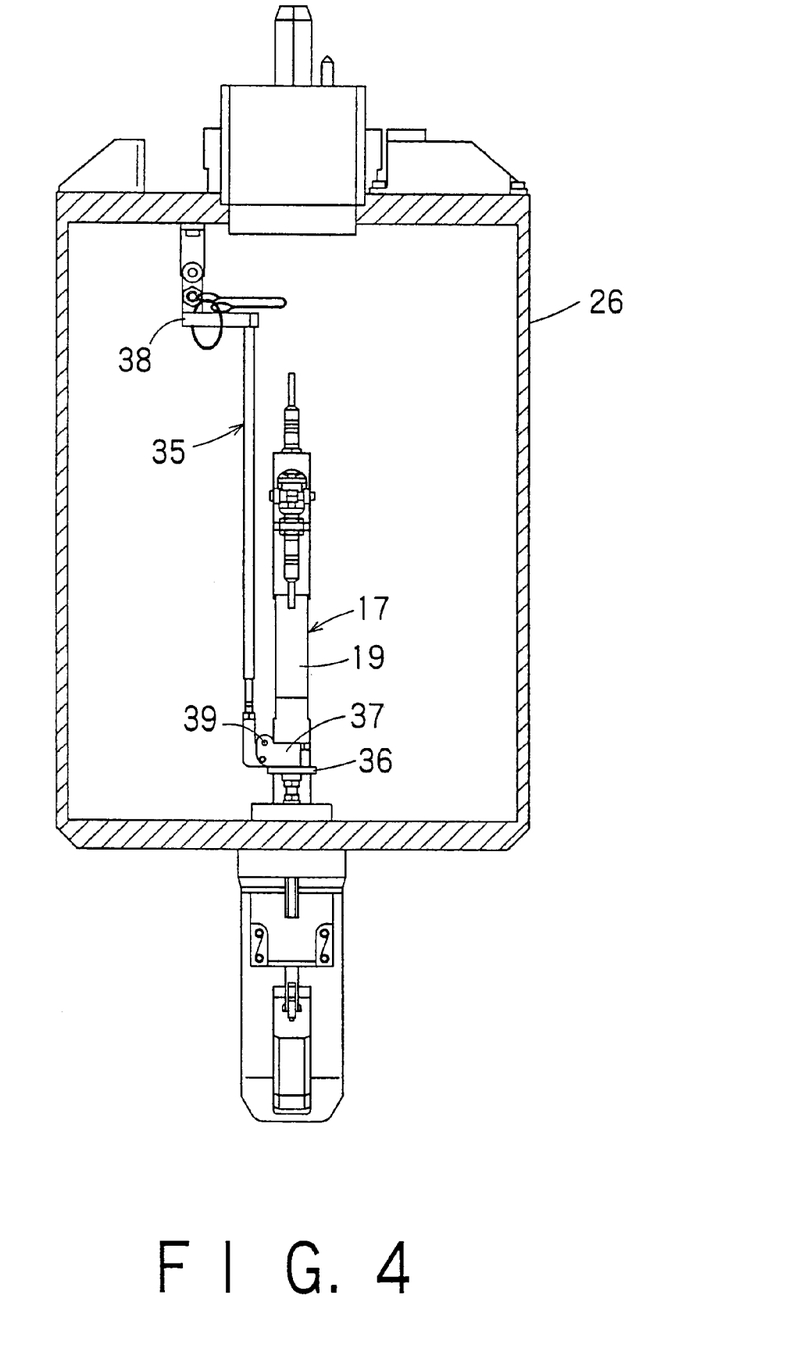
FIG. 4 is a longitudinal sectional view showing a stroke varying mechanism of the reactor-internal equipment handling apparatus according to the embodiment of the present invention.
Figure 5:
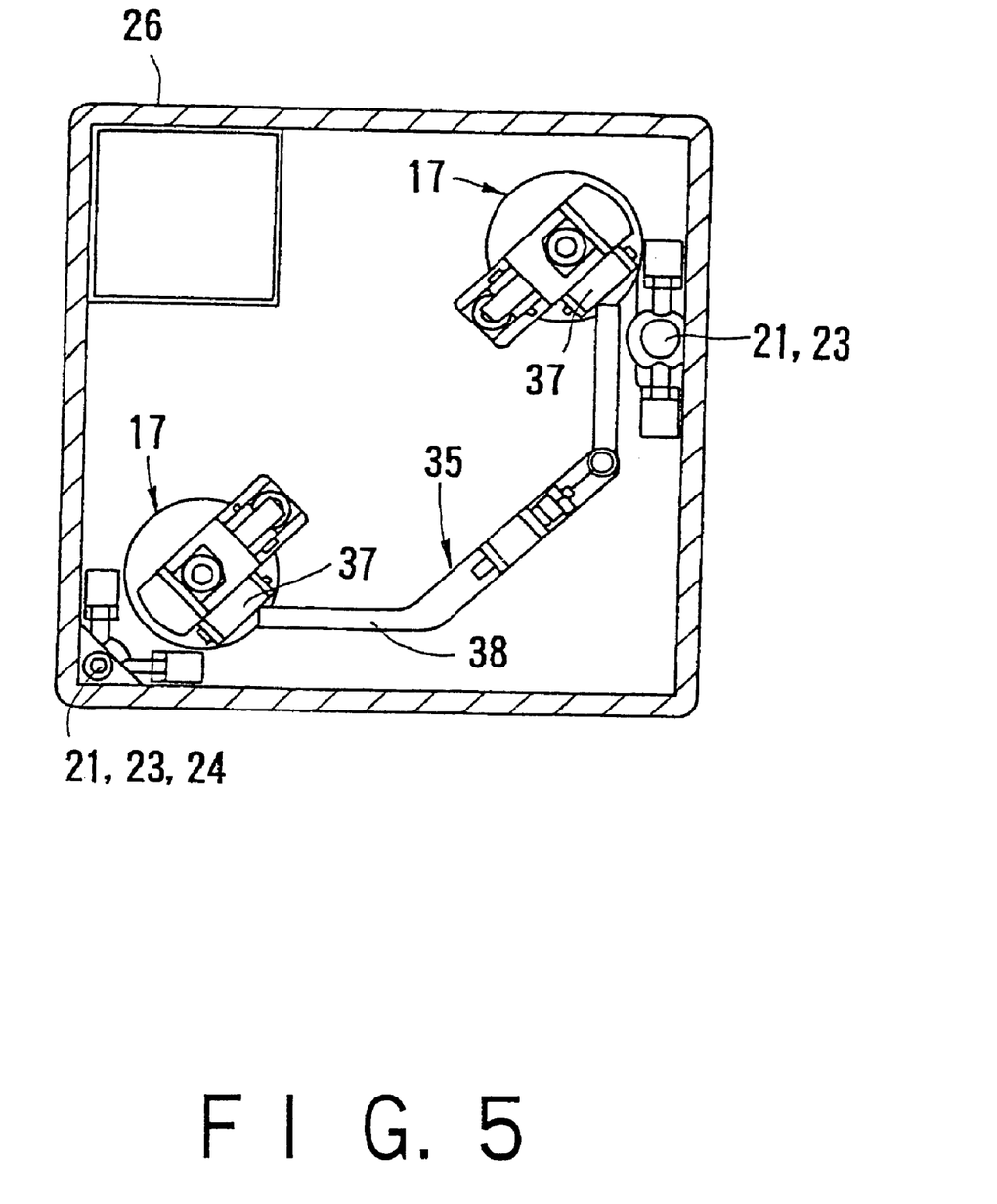
FIG. 5 is a lateral sectional view showing the stroke varying mechanism of the reactor-internal equipment handling apparatus according to the embodiment of the present invention.

As shown in FIG. 4 and FIG. 5, the reactor-internal equipment handling apparatus according to the present embodiment further comprises a stroke varying mechanism 35 which can change an operation stroke of the orifice engaging hook driving cylinder 19.

The stroke varying mechanism 35 is composed of disk-like stoppers 36, stroke varying blocks 37, and an arm 38. The disk-like stoppers 36 are provided to output axes of two orifice engaging hook driving cylinders 19 of the FS/CRGT grapples 17 on the orifice engaging hook linking mechanism 30 side respectively. Each of the stroke varying blocks 37 is rotatably mounted between the disk-like stopper 36 and the orifice engaging hook driving cylinder 19 by pins 39 being provided to a cylinder case.

The arm 38 can couple the stroke varying blocks 37 with each other. When the arm 38 is moved vertically, both stroke varying blocks 37 are put in and out simultaneously.

A swing amount (amount of motion) of the orifice engaging hook 28 can be adjusted by changing an operating stroke of the orifice engaging hook driving cylinder 19 by the stroke varying mechanism 35. Therefore, the orifice engaging hook 28 can be set not to be engaged by the edge portion of the orifice 32 of the CRGT 6. As a result, the FS/CRGT grapple 17 cannot clamp the CRGT 6, but it can clamp only the FS 8.

For example, in the case that a load applied in pulling out the CRGT 6 exceeds a limit load of the hoist of the refueling machine 14 because the core plate 3 and the CRGT 6 have stuck together, only the CR 7 and the FS 8 can be hoisted by operating the stroke varying mechanism 35 in order not to exceed the limit load of the refueling machine 14.

As shown in FIG. 1, the CR grapple 16 is fitted to the main body frame 26 such that it can be slid by a predetermined width along the longitudinal direction of the CR 7. This predetermined sliding width is defined by the distance between the flange portion 70a of the movable member 70 and the inner upper surface 71a of the cap member 71. The movable member 70 is fixed to both the hoist rope 25 and the CR grapple 16. On the other hand, the cap member is fixed to the main body frame 26.

In contrast, the FS/CRGT grapple 17 is secured to the main body frame 26. For this reason, the CR grapple 16 and the FS/CRGT grapple 17 can be relatively displaced mutually along the longitudinal direction of the CR 7. Therefore, when the CR 7, the FS 8, and the CRGT 6 are to be hoisted, first the CR 7 is hoisted slightly and then the FS 8 and the CRGT 6 are hoisted.

In this manner, a time difference can be introduced into an application of the load, which is equivalent to the head pressure caused by the air contained in the CRD housing 4, by hoisting the CR 7 previously, and as a result the simultaneously applied load can be reduced. Accordingly, the hoisting load to unload outside the reactor can be shared much more by the head pressure to lift the CRGT 6.

Figure 6:
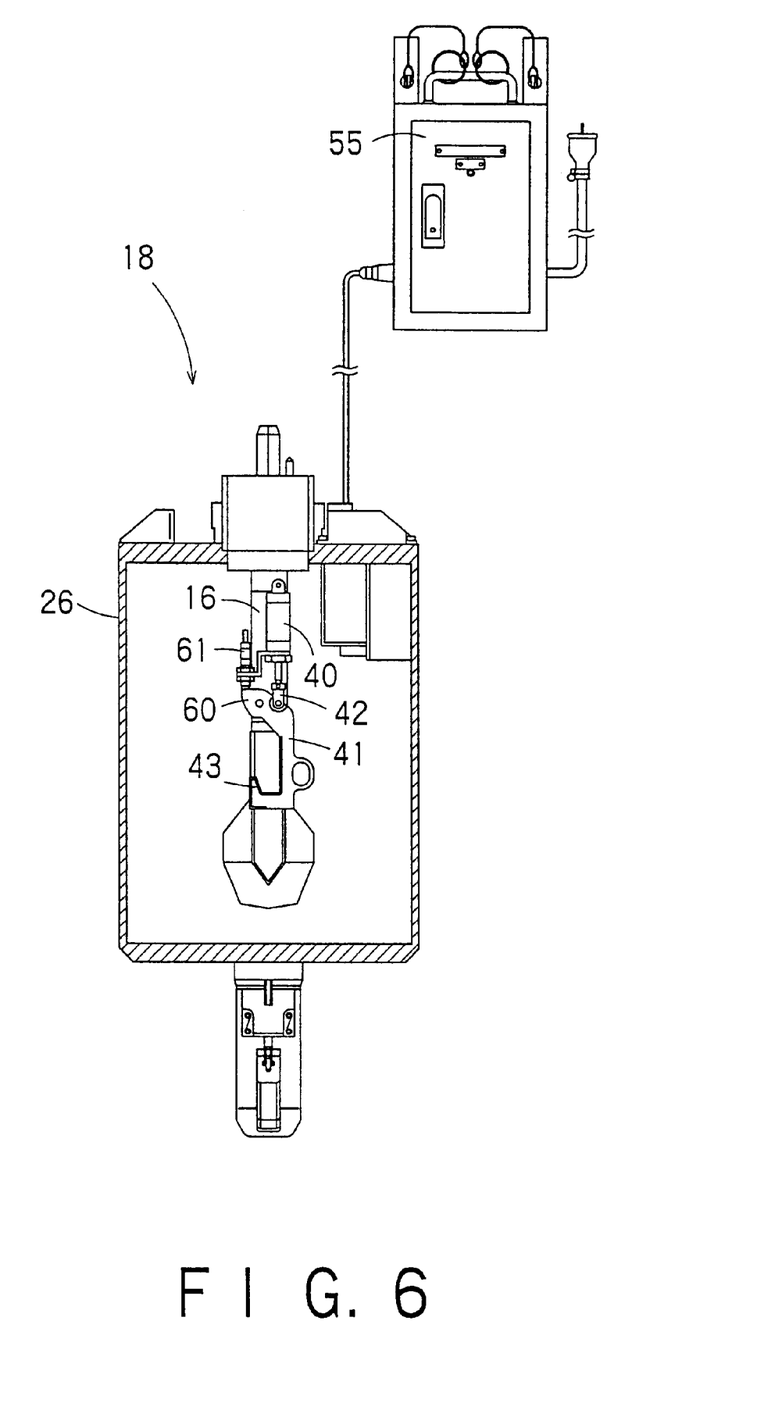
FIG. 6 is a view showing a CR grapple and an external power supply of the reactor-internal equipment handling apparatus according to the embodiment of the present invention.

As shown in FIG. 6, the CR grapple 16 has a hook (handle engaging member) 41 acting as an L-shaped swingable hooking member which can engage a hoisting handle 7a (see FIG. 1) secured to the top end of the CR 7. This hook 41 has a gaff 43. The hook 41 is connected to a hook driving cylinder (handle engaging member driving means) 40 via a linking mechanism 42, and is operated by the hook driving cylinder 40 to be swung.

Then, in the situation that the CR 7 is hoisted via the hook 41, a mechanical lock using its own weight of the CR 7 can be made by the linking mechanism 42 and the gaff 43 of the hook 41. Such mechanical lock can act to hold a engaged state of the hoisting handle 7a by the hook 41.

In addition, as shown in FIG. 6, a clamping state detecting mechanism (holding state detecting mechanism) 60 which detects a clamping state (holding state) of the CR 7 is provided to the CR grapple 16. This clamping state detecting mechanism 60 has a limit switch (detection switch) 61 whose on/off state can be changed depending upon a swing motion of the hook 41. More specifically, an on/off switching operation of the limit switch 61 is performed by a base end portion of the hook 41.

Figure 7:
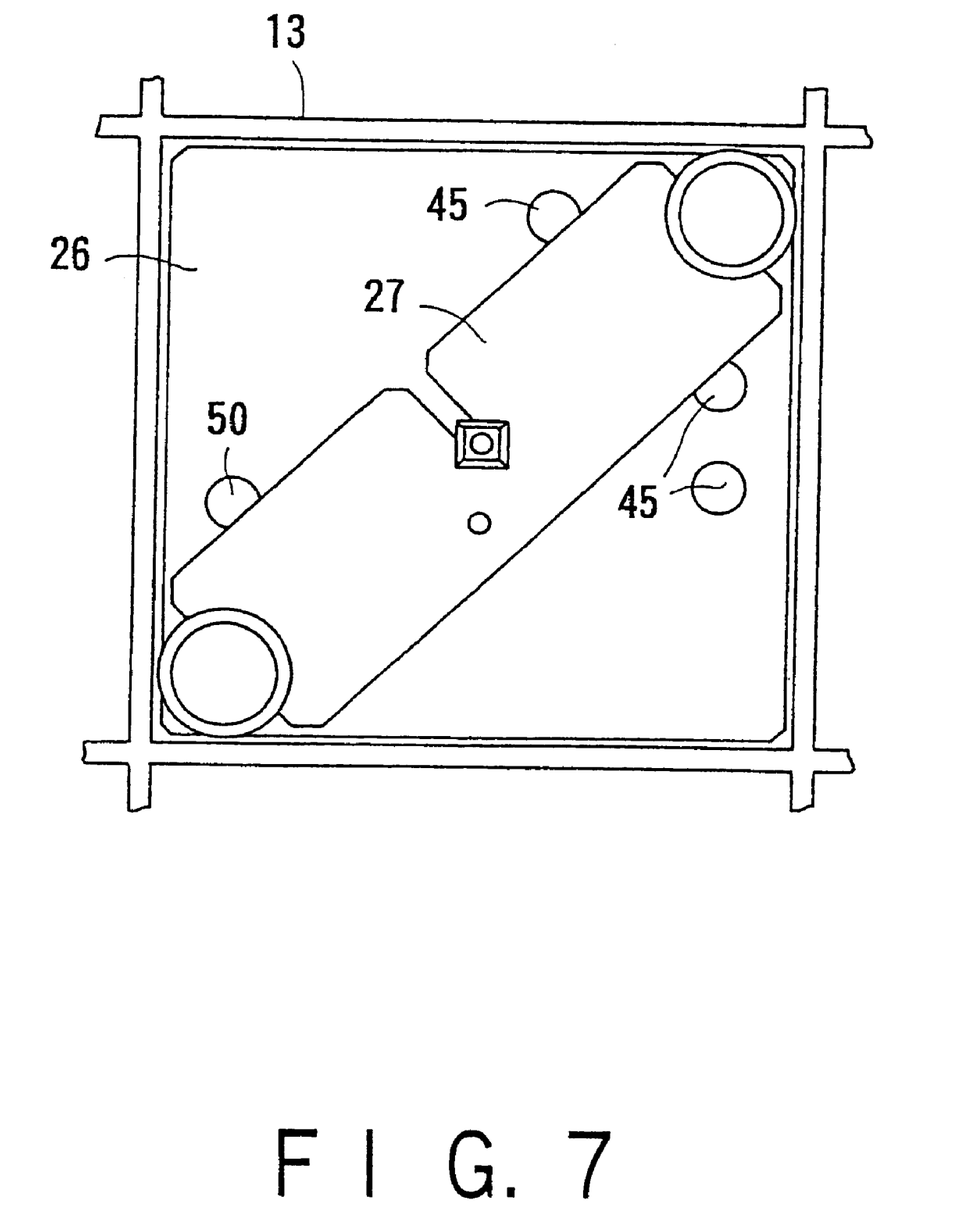
FIG. 7 is a top view showing the main body frame of the reactor-internal equipment handling apparatus according to the embodiment of the present invention.

Also, as shown in FIG. 6, the reactor-internal equipment handling apparatus 18 according to the present embodiment is connected to an external power supply 55 which is arranged apart from the reactor-internal equipment handling apparatus 18. A power supply for clamping state confirming indicator lamps (holding state confirming indicator lamps) 45 and a seating state confirming indicator lamp (positioning state confirming indicator lamp) 50, which are shown in FIG. 7, can be supplied from this external power supply 55. In place of the external power supply 55, a built-in battery (not shown) can be incorporated into the reactor-internal equipment handling apparatus 18. In this case, exchange of the battery must be performed by pulling up the main body frame 26 every run-down of the battery.

If the work of unloading all the CRs 7, the FSs 8, and the CRGTs 6 must be carried out in the preventive maintenance work, etc., it is preferable to supply the power supply from the external power supply 55, which is placed on the refueling machine 14, etc., since an employment term of the reactor-internal equipment handling apparatus 18 is prolonged over a long term.

As shown in FIG. 7, a plurality of clamping state confirming indicator lamps 45 whose lighting state can be changed depending upon a change in clamping states (holding states) are provided to both the clamping state detecting mechanism 20 (see FIG. 3) for the FS 8 and the CRGT 6 and the clamping state detecting mechanism 60 (see FIG. 6) for the CR 7. These clamping state confirming indicator lamps 45 are attached to the top surface of the main body frame 26. The clamping state confirming indicator lamps 45 can switch their lighting states according to on/off states of the limit switches 44, 61 (FIG. 3 and FIG. 6).

In more detail, at least three clamping state confirming indicator lamps 45 are provided. A lighting state of a first clamping state confirming indicator lamp 45 can be switched by the limit switch 61 (see FIG. 6) which is switched depending upon a change in the clamping state of the CR 7.

Also, a lighting state of a second clamping state confirming indicator lamp 45 can be switched by the limit switch 44 (see FIG. 3). When the orifice engaging hooks 28 shown in FIG. 3 is located at the position to clamp both the FS 8 and the CRGT 6, such limit switch 44 can be switched depending upon the change in the clamping state of the FS 8 and the CRGT 6 via the lever mechanism 62.

In addition, a lighting state of a third clamping state confirming indicator lamp 45 can be switched by the limit switch 44. When the orifice engaging hooks 28 is located at the position to clamp only the FS 8, such limit switch 44 can be switched by the output axis of the orifice engaging hook driving cylinder 19 depending upon the change in the clamping state of the FS 8.

In this way, by checking the lighting state of plural clamping state confirming indicator lamps 45 with the naked eye, the operator can know whether or not the reactor-internal equipment handling apparatus 18 has already clamped the CR 7, the FS 8, and/or the CRGT 6.

Figure 8:
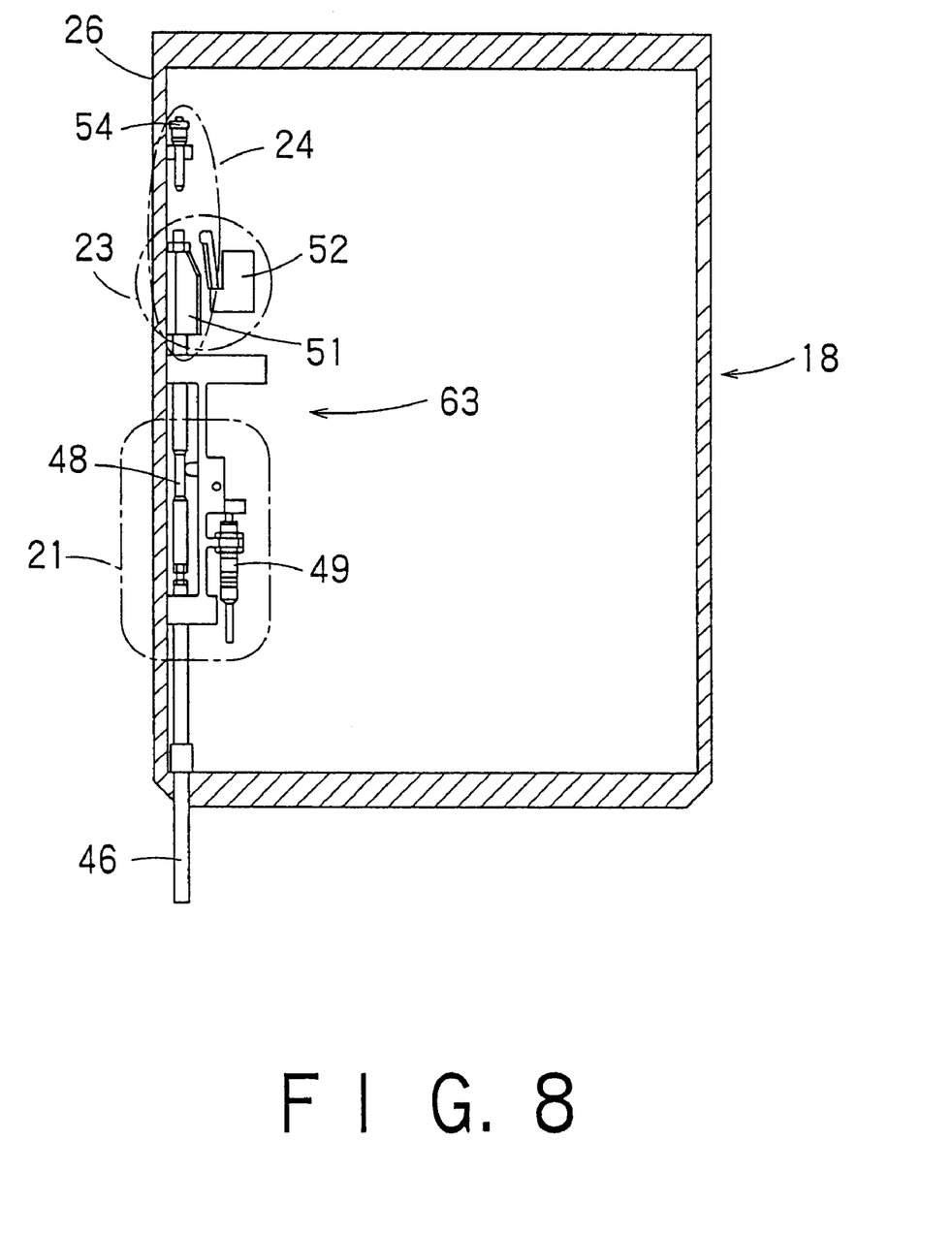
FIG. 8 is a longitudinal sectional view showing a first positioning state detecting mechanism of the reactor-internal equipment handling apparatus according to the embodiment of the present invention.
Figure 9:
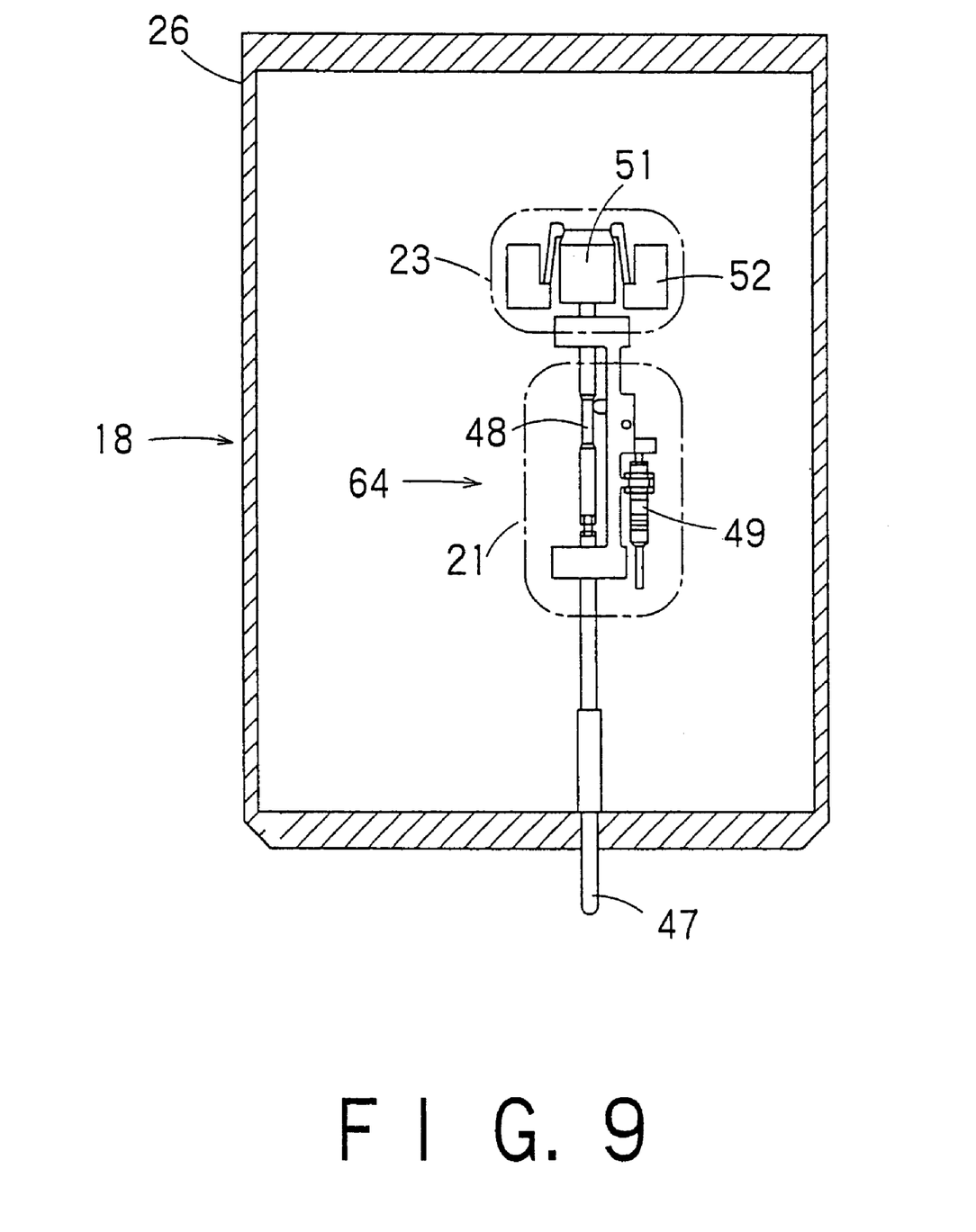
FIG. 9 is a longitudinal sectional view showing a second positioning state detecting mechanism of the reactor-internal equipment handling apparatus according to the embodiment of the present invention.

As shown in FIG. 8 and FIG. 9, the reactor-internal equipment handling apparatus 18 is equipped with a first positioning state detecting mechanism 63 (FIG. 8) and a second positioning state detecting mechanism 64 (FIG. 9), which detect a positioning state of the main body frame 26 in the reactor pressure vessel respectively. As shown in FIG. 8, the first positioning state detecting mechanism 63 consists of a seating state detecting mechanism 21, a motion limiting mechanism 23, and a motion limiting mechanism locking device 24. While, as shown in FIG. 9, the second positioning state detecting mechanism 64 consists of the seating state detecting mechanism 21, and the motion limiting mechanism 23.

The seating state detecting mechanism 21 is composed of seating detecting pins 46, 47, a cam mechanism 48, and a limit switch 49. The seating detecting pin 46 of the first positioning state detecting mechanism 63 is employed to detect the positioning pin 11 (see FIG. 1). The seating detecting pin 47 of the second positioning state detecting mechanism 64 is employed to detect the top surface of the FS 8.

Two seating detecting pins 46, 47 are projected from the bottom surface of the main body frame 26. Thus, when the main body frame 26 is positioned or seated, the seating detecting pins 46, 47 are pushed upwardly by the top surfaces of the positioning pin 11 and the FS 8 on the core plate 3 (see FIG. 1). Such motions of the seating detecting pins 46, 47 are transmitted respectively via the cam mechanisms 48 to the limit switches 49, whereby the limit switches 49 can be operated.

Then, when both limit switches 49 provided to the first positioning state detecting mechanism 63 and the second positioning state detecting mechanism 64 are operated, the seating state confirming indicator lamp 50 (see FIG. 7) provided on the top surface of the main body frame 26 can be illuminated. In this fashion, based on the illuminated state of the seating state confirming indicator lamp 50, the operator can visually check that the main body frame 26 has been seated on the position to properly clamp and unclamp the CR 7, the ES 8, and the CRGT 6.

The motion limiting mechanism 23 has a cam 51 which is operated simultaneously with motions of the seating detecting pins 46, 47, and two valve switches 52, 52 whose on/off is switched by a vertical motion of the cam 51. Then, during the hoisting operation of both the FS 8 and the CRGT 6 or only the FS 8, motions of the orifice engaging hook driving cylinders 19 are limited by an air circuit (not shown) which is connected to the valve switches 52, 52.

In other words, except the case where the main body frame 26 is seated on the proper position or where no load is applied the FS/CRGT grapple 17, i.e., the FS/CRGT grapple 17 is holding nothing, an actuating fluid is not supplied to the orifice engaging hook driving cylinders 19 so as to disable the orifice engaging hooks 28 of the FS/CRGT clamping mechanism 17.

Accordingly, even when either an operating pressure of the orifice engaging hook driving cylinders 19 is lost or the operator performs the wrong operation in the course of the hoisting operation of both the FS 8 and the CRGT 6 or only the FS 8, the reactor-internal equipment handling apparatus 18 never releases the FS 8 and the CRGT 6.

As shown in FIG. 8, the motion limiting mechanism locking device 24 is composed of a ball lock pin 54 and a stepped hole (not shown). The ball lock pin 54 is fitted to the upper portion in the main body frame 26. The stepped hole is formed over the motion limiting mechanism cam 51.

The motion limiting mechanism locking device 24 is employed to use the Pin-FS 22 (see FIG. 13). More specifically, the Pin-FSs 22 which support a mimic fuel assembly (not shown) are provided to the peripheral portions of the core of the BWR. When the Pin-FSs 22 are employed, the main body frame 26 is rotated by 90 degree rightward or leftward rather than a normal orientation to avoid interference with the pin 53 (see FIG. 13), and then seated. The pin 53 is provided in the Pin-FS 22 to indicate the position of the mimic fuel assembly. In this case, detection of the seating state and restriction of the motion by virtue of the positioning pin 11 provided on the core plate 3 cannot be achieved. Therefore, the motion limiting mechanism 23 is operated and thus the motion of the orifice engaging hook 28 of the FS/CRGT grapple 17 is inhibited. As a result, the Pin-FS 22 and the CRGT 6 cannot be removed.

For this reason, in such case, the ball lock pin 54 is inserted into a hole formed on the upper area of the cam 51 of the motion limiting mechanism 23 to lock the cam 51. At that time, since the seating detecting pin 46 of the first positioning state detecting mechanism 63 has already been in a seated condition, the seating on the normal position can be detected only by detecting the top surface of the Pin-FS 22 by the seating detecting pin 47 of the second positioning state detecting mechanism 64. As a result, clamping/unclamping of the Pin-FS 22 and the CRGT 6 can be achieved.

In case the Pin-FS 22 is handled as described above, a function of the motion limiting mechanism 23 is lost. In this case, since the mechanical lock which has already been mentioned can be operated, the hoisted substance is in no way released even if, for example, the operating pressure of the orifice engaging hook driving cylinder 19 is lost or the operator performs the wrong operation.

As described above, according to the reactor-internal equipment handling apparatus 18 of the embodiment of the present invention, in the event that the removing operation or the installing operation of the CR 7, the FS 8, and the CRGT 6 must be performed in the periodical inspection or the preventive maintenance work, all of the CR 7, the FS 8, and the CRGT 6 can be loaded/unloaded into/from the reactor simultaneously by the CR grapple 16 and the FS/CRGT grapple 17. Therefore, the number of steps can be reduced to half based on a simple calculation rather than the case where the CR 7 and the FS 8 are handled separately from the CRGT 6 in the related art, so that a term of work can be shortened considerably. In the reactor-internal equipment handling apparatus 18 according to the embodiment of the present invention, an operability can be assured to the same extent as the CR & FS grapple in the related art or more.

In addition, if the CR & ES grapple and the CRGT grapple in the related art are employed, the CR 7, the ES 8 and the CRGT 6 must be stored separately based on the installing order in the reactor. Therefore, the wide storage space is needed as the fuel pool serving as the storage area. On the contrary, according to the reactor-internal equipment handling apparatus 18 of the embodiment of the present invention, since the CR 7, the ES 8, and the CRGT can be handled together, they can be stored collectively. Therefore, based on a simple calculation, the storage space can be reduced to half of the storage space needed in the related art.

As described above, according to the reactor-internal equipment handling apparatus and method of the present invention, since all of the control rod, the fuel support, and the control rod guide tube can be loaded/unloaded into/from the reactor simultaneously, both reduction in the term of work and reduction in their storage spaces can be achieved.

What is claimed is:

1. A reactor-internal equipment handling method of loading/unloading equipment into/from a reactor vessel with a reactor-internal equipment handling apparatus comprising:

control rod holding means for releasably holding a control rod which is loaded in a reactor vessel, fuel support/control rod guide tube holding means for releasably holding both a fuel support, which supports a bottom end of a fuel assembly, and a control rod guide tube, on which the fuel support is placed at a top end, a main body frame to which both the control rod holding means and the fuel support/control rod guide tube holding means are fitted and adapted to be hung down inside the reactor vessel, a holding state detecting mechanism for detecting both a holding state of the control rod holding means about the control rod, and a holding state of the fuel support/control rod guide tube holding means about the fuel support and the control rod guide tube, and a position state detecting mechanism for detecting a positioning state of the main body frame in the reactor vessel, the method comprising:

detecting a positioning state of the main body frame in the reactor vessel with the positioning state detecting mechanism in order to confirm that the main body frame is properly positioned;

holding the control rod by the control rod holding means and also holding both the fuel support and the control rod guide tube with the fuel support/control rod guide tube holding means;

detecting, with the holding state detecting mechanism, both a holding state of the control rod holding means about the control rod and a holding state of the fuel support/control rod guide tube holding means about the fuel support and the control rod guide tube, to confirm that the control rod holding means holds the control rod and the fuel support/control rod guide tube holding means holds the fuel support and the control rod guide tube; and hoisting the main body frame by a fuel exchanger and simultaneously loading or unloading all of the control rod, the fuel support, and the control rod guide tube into or from the reactor vessel.

2. A reactor-internal equipment handling method according to claim 1, wherein the fuel support/control rod guide tube holding means includes an orifice engaging member which is adapted to engage edge portions of orifices formed in the fuel support and the control rod guide tube, an orifice engaging member linking mechanism for manipulating the orifice engaging member, and orifice engaging member driving means for driving the orifice engaging member linking mechanism, and wherein the orifice engaging member is simultaneously brought into contact with the edge portions of the orifices formed in the fuel support and the control rod guide tube.

* * * * *